United States Patent Office 3,487,760
Patented Jan. 6, 1970

3,487,760
PHOTOGRAPHIC MIRROR REFLEX CAMERA WITH PENTA PRISM FOCUSING FINDER
Hermann Bretthauer, Stockheim, and Heinz Hamm and Joachim Madge, Braunschweig, Germany, assignors to Rollei-Werke Franke & Heidecke, Braunschweig, Germany, a German firm
Filed Jan. 19, 1967, Ser. No. 610,403
Claims priority, application Germany, Jan. 20, 1966, R 42,462
Int. Cl. G03b *19/12*
U.S. Cl. 95—42                                3 Claims

ABSTRACT OF THE DISCLOSURE

A mirror reflex camera with a penta prism for erecting the image produced on the finder screen, and an eyepiece for viewing the erect image from the penta prism. Between the penta prism and the eyepiece is a half-silvered beam splitting prism which transmits part of the light (through the full area of the beam) onward toward the eyepiece and reflects part of the light (through the full area of the beam) toward a photo resistance which is part of the automatic exposure control mechanism. A lens interposed between the beam splitting surface (in one embodiment) or a curvature of the beam splitting surface (in another embodiment) forms an image of the entrance pupil of the main lens on the photo resistance element.

---

Figure 1:
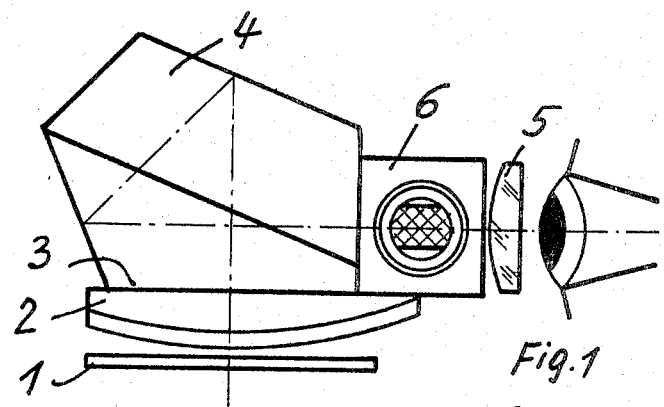

The present invention relates to a photographic mirror reflex camera with penta prism focusing finder and exposure meter and exposure control, the light measuring being effected through the main lens, i.e. in the case of single lens mirror reflex cameras through the main camera lens and in the case of twin lens mirror reflex cameras through the viewfinder lens.

In such cameras the image on the focusing screen is inspected by the user through a penta prism by means of a magnifying eyepiece. This results in an upright and the right-way-round image; in addition, the direction of view is parallel to the axis of the camera main lens.

With photoelectric exposure meters and exposure control devices which are built into cameras, measuring is today mainly effected integrating over the entire visual field or image field. That results in certain measuring faults because the picture contrast is not being registered, i.e. an object area with high contrast consisting for instance of 50% extremely dark and of 50% extremely bright parts, yields the same exposure value as a uniform grey subject with low contrasts and of medium brightness. The exposure meter, therefore, cannot—at least not without the cooperation of the photographer—guarantee a correctly exposed picture, it can, however, prevent incorrectly exposed pictures.

This deficiency can be prevented by measuring either point by point or the bright and the dark picture parts separately, according to whether one or the other is important for the exposure and determining the exposure time therefrom. Such methods and devices are known, however, they are not suited for the amateur.

It is however, obvious that for exposure measuring one should cover as exactly as possible the same image field as the camera lens, under no circumstance a larger one. This would quite obviously lead to faulty measurings.

In the case of mirror reflex cameras—single as well as twin-lens reflex ones—the taking or view-finder lens respectively offer themselves for the delimation of the image field of the exposure meter, i.e. measuring through the lens. On single lens reflex cameras the influence of stopping down the lens can thus automatically be considered.

With respect particularly to a single lens mirror reflex camera with a penta prism between the focusing screen or ground glass and the eyepiece, there are various ways of placing a photoelectric cell between the lens and the eyepiece. But for obtaining correct measurement by the photocell, it must be placed in such a way that the photocell receives, as exactly and completely as possible, the full viewfinding image and no more than this image. In other words, the entire image on the focusing screen, or the entrance pupil of the main lens or the exit pupil of the viewfinder, must be completely imaged or reproduced on the photocell, in such manner that at full aperture (maximum diaphragm aperture) substantially the complete area of the photocell is illuminated. With this arrangement, the photocell "sees" just the image to which the film will be subjected when the exposure is made, no more and no less. Thus accurate control of the variable factors of the exposure, by the photocell, is possible.

As contrasted with this desirable arrangement according to the present invention, it is seen that various other possible arrangements will give results which are less accurate. For example, if the photocell is placed behind a partially light-transmitting reflex mirror or behind a partially light-transmitting mirror surface of the penta prism, the foreground of the scene to be photographed would be favored in comparison to the background of the scene, because of the different distance from the lens. If the photocell is ring-shaped around the eyepiece, it would respond only to that portion of the cone of light which lies outside of the angle of view. If the image of the diaphragm (at maximum aperture) at the photocell is larger than the area of the photocell, the stopping down of the diaphragm would become effective on the photocell only when the aperture has been reduced to such size that its image coincides with the diameter of the photocell. These possible causes of inaccuracy are avoided by the present arrangement.

According to the invention, the photo resistance is installed in a camera with penta prism viewfinder in the vicinity of the eyepiece, and a semitransparent mirror or beamsplitter is put in the eyepiece beam installing it with a reproducing optical system which reproduces through the penta prism the viewfinder image with the largest possible aperture on the light sensitive surface of the photo resistance to deflect a certain part of the light beam off to the photoresistance. In certain cases the mirror itself may be designed as image-forming system, the beam splitting surface being concave, so that its reflection effects in combination with the field lens of the finder forms a real image of the entrance pupil of the main lens.

On the drawings two embodiments of the subject matter of invention are represented whereby only the essential parts are shown.

Figure 2:
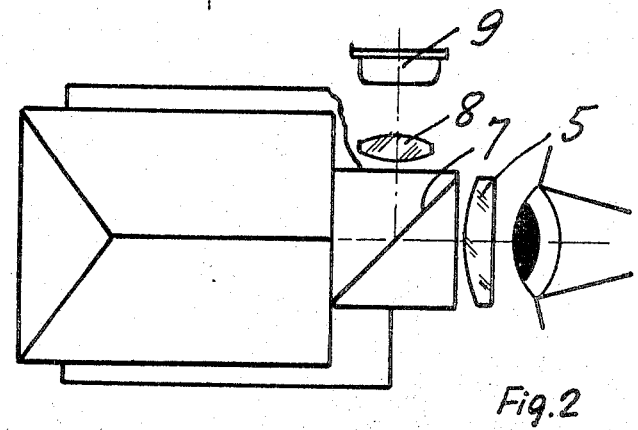
Figure 3:
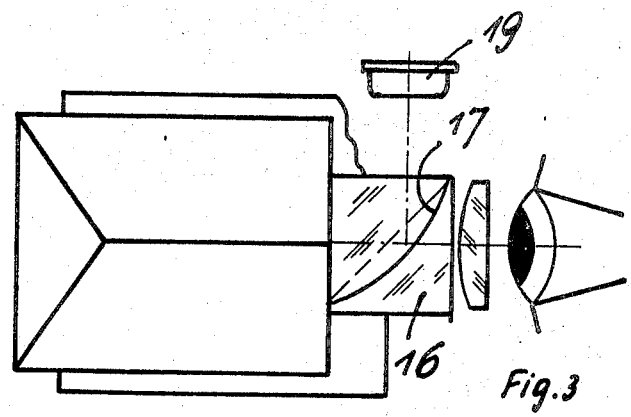
Figure 4:
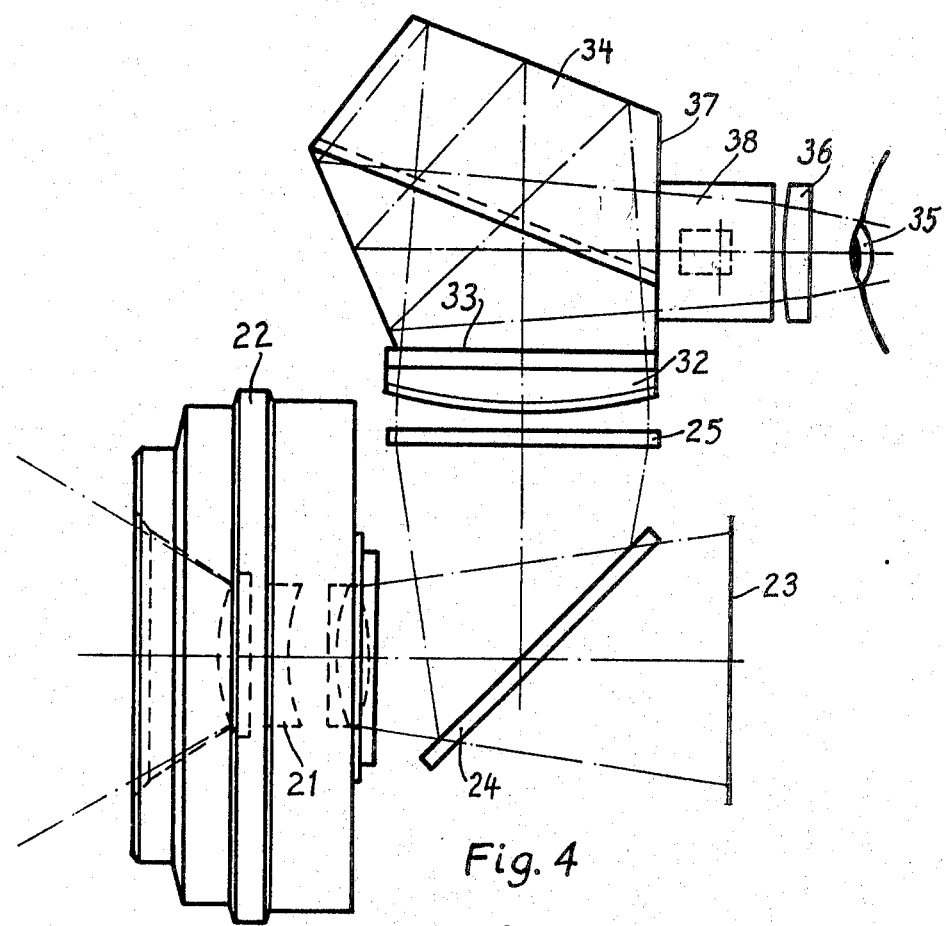
Figure 5:
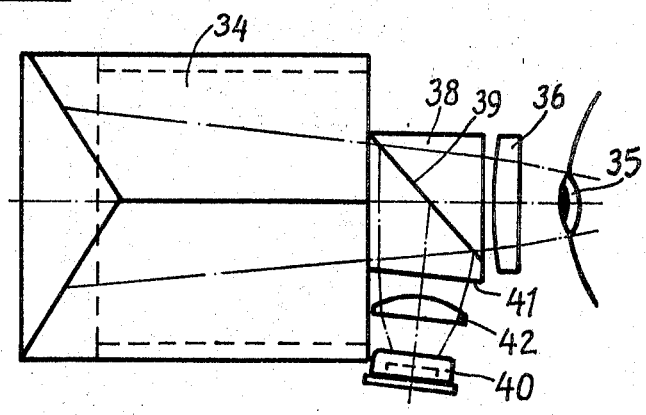

FIGURES 1 and 2 show the side elevation and plan view of an embodiment with dioptric reproducing system, FIGURE 3 a construction of the reflection surface itself as reproducing system, FIGURES 4 and 5 show a similar embodiment as FIGURES 1 and 2 amplified by the main camera parts.

Over the focusing screen 1 is placed a field lens 2, on which the penta prism 4 with its entrance plane 3 is cemented. The plane surface of the field lens has been extended in the direction towards the eyepiece 5 so that on this extension a beam splitting prism 6 can be cemented in addition. By means of the partially light-permeable silver-coated surface 7 a part of the beam will be reflected in a right angle to the axis of the eyepiece and will be reproduced with the aid of the field lens through the lens 8 on the photo resistance 9.

In FIGURE 3 the beam splitting surface 17 of the prism 16 has been executed as a concave surface which assures the function of the reproducing system so that this system 8 can be abolished.

In FIGURES 4 and 5, another embodiment is shown which varies from the embodiment as shown in FIGURES 1 and 2 in that the reflection of the light to the photo electric cell is not effected at an exact right angle to the optical axis, but at an acute angle, thus saving still additional space for its location, since the photo cell can be installed nearer to the penta prism. In addition, FIGURES 4 and 5 show the entire ray path of the camera. The camera lens 21 is located in the shutter housing 22 of the camera and reproduces an image of the subject on the photographic film 23 or by means of a reflex mirror 24 on a ground glass 25 respectively. Usually, this reflex mirror 24 in the camera is a flap mirror so that either the light is transmitted to the film 23 or the image to be taken is projected on the ground glass 25. It is taken for granted that the further particulars of such reflex cameras are well-known and to simplify matters they are, therefore, not shown in the figure. Above the ground glass 25 there is the field lens 32 which is cemented on the entrance surface 33 of the penta prism 34. In this penta prism, the beam is repeatedly refracted so that when inspecting the ground glass image by the observing eye 35 with the aid of the magnifier 36, an upright and correctly oriented image will be seen. Between the emergent surface 37 of the penta prism and the eyepiece 36 a beam splitter 38 has been placed which is provided with a semi-light permeable reflecting mirror coating 39. The size of this beam splitter 38 or the mirror coating 39 respectively is such that they register the entire cone of rays of the light taken by the eyepiece 36 and thus reflect a certain portion of this entire light on the photo electric cell 40. Between the emergent surface 41 of this beam splitter and the photo electric cell a convex lens 42 is placed, the dimensions of which are chosen in accordance with the dimensions of the photo cell in such a way that on one hand it covers the entire diameter of the cone ray, and its refractive power is chosen in such a way that it, in connection with the refractive power of the field lens, reproduces the entire entrance pupil of the main lens, i.e. of the camera lens 21, on the photo resistance 40.

What is claimed is:

1. A photographic camera of the mirror reflex type, including a first lens, a focusing screen arranged approximately parallel to the optical axis of said first lens, a reflex mirror arranged to receive a beam of light from said lens and reflect it to said focusing screen, a field lens associated with said focusing screen, a penta prism overlying said focusing screen in position to project light from said focusing screen rearwardly along a finder axis toward the eye of an observer, a magnifying eyepiece arranged on said finder axis and spaced rearwardly along said axis from said penta prism, a light meter photoresistance element laterally offset from said finder axis, a beam splitter located on said finder axis between said penta prism and said eyepiece and effective to transmit part of the light along said axis toward said eyepiece and to reflect part of the light laterally toward said photoresistance, and light projection means operating on that part of the light which is reflected by said beam splitter and effective, in combination with said field lens, to project an image of the entrance pupil of said first lens onto said photoresistance.

2. A construction as defined in claim 1, wherein said light projection means comprises a separate lens located between said beam splitter and said photoresistance, in the path of light rays passing from said beam splitter toward said photoresistance.

3. A construction as defined in claim 1, wherein said light projection means comprises a curved beam-splitting surface of said beam splitter.

References Cited

UNITED STATES PATENTS

| | | | |
|---|---|---|---|
| 3,264,964 | 8/1966 | Ebertz | 95—42 |
| 3,332,331 | 7/1967 | Mandler | 95—42 |

FOREIGN PATENTS

| | | |
|---|---|---|
| 1,208,620 | 1/1966 | Germany. |
| 1,208,621 | 1/1966 | Germany. |
| 1,213,232 | 3/1966 | Germany. |

NORTON ANSHER, Primary Examiner

RICHARD L. MOSES, Assistant Examiner

U.S. Cl. X.R.

95—10